US009954800B2

(12) United States Patent
Beecroft et al.

(10) Patent No.: US 9,954,800 B2
(45) Date of Patent: Apr. 24, 2018

(54) MULTI-PATH NETWORK WITH FAULT DETECTION AND DYNAMIC ADJUSTMENTS (75) Inventors: Jon Beecroft, Bristol (GB); Anthony Michael Ford, Bristol (GB); David Charles Hewson, Bristol (GB)

(73) Assignee: Cray UK Limited, Reading (GB)

( * ) Notice: Subject to any disclaimer, the term of this patent is extended or adjusted under 35 U.S.C. 154(b) by 1199 days.

(21) Appl. No.: 13/059,037

(22) PCT Filed: Aug. 5, 2009

(86) PCT No.: PCT/GB2009/001922
§ 371 (c)(1),
(2), (4) Date: Mar. 29, 2011

(87) PCT Pub. No.: WO2010/018361
PCT Pub. Date: Feb. 18, 2010

(65) Prior Publication Data
US 2011/0170405 A1 Jul. 14, 2011

(30) Foreign Application Priority Data

Aug. 14, 2008 (GB) .................................. 0814869.4

(51) Int. Cl.
*H04L 12/939* (2013.01)
*H04L 12/947* (2013.01)
(Continued)

(52) U.S. Cl.
CPC ............ *H04L 49/557* (2013.01); *H04L 49/25* (2013.01); *H04L 49/1515* (2013.01); *H04L 49/253* (2013.01)

(58) Field of Classification Search
None
See application file for complete search history.

(56) References Cited

U.S. PATENT DOCUMENTS 6,452,926 B1 9/2002 Wiklund
2002/0004843 A1 1/2002 Andersson et al.
(Continued)

FOREIGN PATENT DOCUMENTS

WO    WO-0004741 A1    1/2000

OTHER PUBLICATIONS

International Search Report; dated Oct. 23, 2009; Authorized Officer: Athanasios Mariggis.

*Primary Examiner* — Marcus R Smith
(74) *Attorney, Agent, or Firm* — Craig J. Lervick; Larkin Hoffman Daly & Lindgren, Ltd.

(57) ABSTRACT

A multi-path network for use in a bridge, switch, router, hub or the like, includes a plurality of network ports; a plurality of network elements; and a plurality of network links interconnecting the network elements and the network ports, for transporting data packets. Each network element has a fault monitor for detecting faults on the network links to which the network element is connected, a plurality of dynamically selectable output ports and output port selection mechanism. Each network element also being adapted to communicate the existence of a fault back to one or more other network elements so that network elements connected to the faulty network link can be bypassed, and each network element being adapted to update the output port selection mechanism when communication of the existence of a fault is received so that only those output ports which ensure the faulty network link is bypassed are dynamically selectable. Also, a method of managing faults in a multi-path network utilizes a similar methodology to insure that identified faults are avoided.

21 Claims, 5 Drawing Sheets (51) Int. Cl.
  *H04L 12/933* (2013.01)
  *H04L 12/937* (2013.01)

(56) References Cited

U.S. PATENT DOCUMENTS

| | | |
|---|---|---|
| 2002/0116669 A1 | 8/2002 | Jain |
| 2003/0063613 A1 | 4/2003 | Carpini et al. |
| 2004/0085894 A1* | 5/2004 | Wang et al. .................. 370/216 |
| 2005/0002334 A1 | 1/2005 | Chao et al. |
| 2005/0036452 A1 | 2/2005 | Banerjee et al. |
| 2007/0223368 A1 | 9/2007 | Ozaki |
| 2008/0263386 A1* | 10/2008 | Darrington et al. .............. 714/4 |
| 2009/0063891 A1* | 3/2009 | Arimilli et al. .................... 714/2 |
| 2009/0154454 A1* | 6/2009 | Wittenschlaeger ........... 370/389 |
| 2009/0185480 A1* | 7/2009 | Saltsidis ........................ 370/218 |
| 2009/0274044 A1* | 11/2009 | Goose et al. .................. 370/225 |

\* cited by examiner

PRIOR ART

Errors

MULTI-PATH NETWORK WITH FAULT DETECTION AND DYNAMIC ADJUSTMENTS

BACKGROUND

Technical Field of the Invention

The present invention generally relates to a multi-path network which is adapted to manage faults arising in the network and to a method of data delivery across such a network. The multi-path network and method are suitable for use in, but not limited to, multi-processor networks such as storage networks, data centres and high performance computing. In particular, the present invention is suited for use in bridges, switches, routers, hubs and similar devices including Ethernet devices adapted for the distribution of standard IEEE 802 data frames or data frames meeting future Ethernet standards.

Protocol Layers

Conceptually, an Ethernet network is decomposed into a number of virtual layers in order to separate functionality. The most common and formally standardised model used is the Open Systems Interconnect (OSI) reference model. A useful article that describes in detail the OSI reference model is "OSI Reference Model—The ISO Model of Architecture for Open Systems Interconnection" by Hubert Zimmermann, IEEE Transactions on Communications, Vol. COM-28, No. 4, April 1980. The OSI reference model comprises seven layers of network system functionality, as follows:

1. Physical Layer is responsible for physical channel access. It consists of those elements involved in transmission and reception of signals, typically line drivers and receivers, signal encoders/decoders and clocks.
2. Data Link Layer provides services allowing direct communication between end-station devices over the underlying physical medium. This layer provides Framing, separating the device messages into discrete transmissions or frames for the physical layer, encapsulating the higher layer packet protocols. It provides Addressing to identify source and destination devices. It provides Error Detection to ensure that corrupted data is not propagated to higher layers.
3. Network Layer is responsible for network-wide communication, routing packets over the network between end-stations. It must accommodate multiple Data Link technologies and topologies using a variety of protocols, the most common being the Internet Protocol (IP).
4. Transport Layer is responsible for end-to-end communication, shielding the upper layers from issues caused during transmission, such as dropped data, errors and mis-ordering caused by the underlying medium. This layer provides the application with an error-free, sequenced, guaranteed delivery message service, managing the process to process data delivery between end stations. Transmission Control Protocol (TCP) and User Datagram Protocol (UDP) are the most commonly recognised Transport Layer protocols.
5. Session Layer is responsible for establishing communications sessions between applications, dealing with authentication and access control.
6. Presentation Layer ensures that different data representations used by machines are resolved.
7. Application Layer provides generic functions that allow user applications to communicate over the network.

For the purposes of this document we need not consider operations above the Transport Layer as the method described herein should, if well implemented, shield higher layers from issues arising in and below its scope.

Large data networks can be constructed from many tens of thousands of components and some level of failure is inevitable. Although network protocols are designed to be tolerant to failures, components that introduce errors can easily destroy the performance of the network even though the failing components represent a tiny percentage of the total network hardware. Cracked solder joints or damaged connectors can sometimes very significantly increase the error rate of a network connection without completely breaking the connection. In some ways these connections with very high error rates are worse than completely broken connections as they may only present intermittent problems that are not conspicuous when a network topology is evaluated or when diagnostic programs are run and engineering resources are available to repair the network.

Transport layer network protocols, such as TCP, introduce reliability to an otherwise unreliable network infrastructure. These protocols achieve their robustness through checking codes such as cyclic redundancy checks (CRC), timeouts and retries. However, the overhead of detecting an error and then responding through a request to resend the data is very significant and becomes more significant as the bandwidth of the transport medium increases. If errors occur in the retried data then the loss of performance can be crippling.

Very occasional errors can be acceptable provided the error rate is low enough to make the retries overhead tiny. Having detected an error within the network it should be possible to prevent that error from re-occurring. All too often a broken or partially working connection repeatedly introduces the same error over and over again causing many hundreds of thousands of retries where only one should occurred.

Most network systems have error monitoring. This usually involves a controlling management processor either polling or being interrupted by the network hardware and then noting that an error has been detected in a portion of the network. A new set of routes are then calculated for the network as a whole that route traffic around the offending network connection until it can be repaired.

For Ethernet networks routes are calculated by an additional protocol defined in the IEEE 802.1D standard. The Rapid Spanning Tree Protocol (RSTP) and the Spanning Tree Protocol (STP) it supersedes, operates at the Data Link Layer. Its intended purpose is to remove multiple active paths between network stations, avoiding loops, which create a number of problems.

If an error or sequence of errors is detected on a link then a management agent could decide to assign a very high cost associated with using the link. Changing the cost function would re-invoke the RSTP and the very high cost value would discourage the inclusion of the link by the RSTP. Alternatively, the management agent could disable the link, again invoking the RSTP and this time preventing inclusion of the link in the new routing. Using the RSTP has some problems. It can take many milliseconds for the RSTP to re-evaluate the network. For a very large network this could be tends or hundreds of milliseconds. Also while a network is being reconfigured packets can arrive out of order, be duplicated or lost by the network. Again, for a very large network, this could be extremely disruptive causing many retries of different conversations.

A device that implements network services at the Data Link Layer and above is called a station. The Physical Layer is excluded from this definition as it is not addressable by a protocol. There are two types of station:

1. End Stations are the ultimate source and destination of network data communication across the network.
2. Intermediate Stations forward network data generated by end stations between source and destination.

An intermediate station which forwards completely at the Data Link Layer is commonly called a Bridge; a station which forwards at the Network Layer is commonly called a Router.

Network data is fragmented into pieces as defined by the protocol. This combined, layer specific Protocol Data Unit (PDU), which generally consists of a header and a body containing the payload data, is then passed down the protocol stack. At the Ethernet Physical Layer the PDU is often called a stream; at the Ethernet Data Link Layer the PDU is often called a frame; at the Ethernet Network Layer the PDU is often called a packet; and at the Transport Layer the PDU is often called a segment or message.

PDUs are encapsulated before being transmitted over the physical Ethernet hardware. Each encapsulation contains information for a particular OSI Layer, the Ethernet stream encapsulates a frame which in turn encapsulates a packet which encapsulates a message and so on. This encapsulation, containing headers and payload, is finally transmitted over the network fabric and routed to the destination.

Some networks use adaptive routing which is an effective method for improving the total throughput of a busy network. Adaptive routing takes advantage of multiple routes that can exist from ingress to egress ports on the network. Having multiple routes allows data moving through the network to avoid congestion hot spots. Multiple routes also increase the fault tolerance of the network, allowing an internal network fabric link to be disabled while still providing a connection from the ingress to the egress ports.

Figure 1:
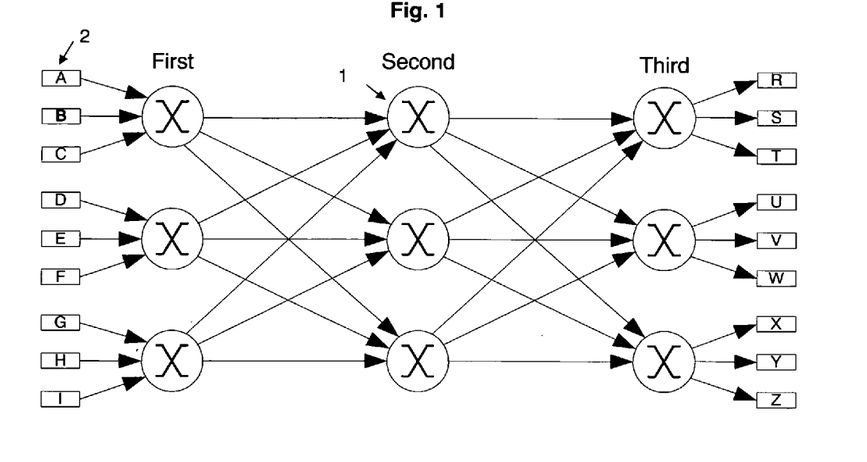
FIG. 1 shows a conventional multi-path network.
Figure 2:
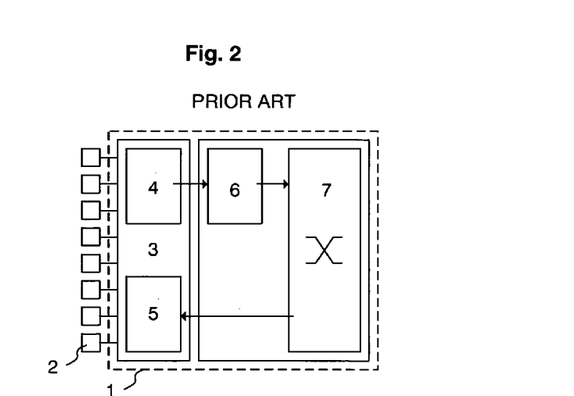
FIG. 2 illustrates a conventional crossbar of the network of FIG. 1.

FIG. 1 illustrates schematically a simplified conventional multi-path network. The rectangles on the left and right represent ingress and egress ports 2 respectively. The circles represent network crossbars 1 and the lines represent the interconnecting links, over which PDUs will traverse the network. In this example each network crossbar 1 has only three input ports and three output ports 2. Typically network crossbars have many more ports than this and this mechanism works equally well with higher arity crossbars. An example of a conventional network crossbar 1 is illustrated in FIG. 2.

In the illustrated example, a simple approach to adaptive routing would be to choose a random route out of the first switching stage that was on a link not being used by another traffic flow. This form of adaptive routing usually improves the expected total throughput for a saturated network traffic pattern but it is not controlled and could still easily result in some idle links and some over committed links between the second and third stages of switching.

DESCRIPTION OF RELATED ART

In WO 2007/022183 a method for managing nodes on a fault tolerant network is described. The method requires a switch to terminate traffic on a network channel and a network manager to reroute the traffic on a different channel. The re-routing described herein by the network manager, especially where the network has a large number of nodes and links, will experience the same problems that were described earlier in terms of the appreciable delay experienced during re-evaluation of the network by the manager.

The present invention seeks to overcome the problems encountered with conventional multi-path networks and in particular seeks to provide a network which is tolerant to faults.

SUMMARY OF THE INVENTION

The present invention provides a multi-path network for use in a bridge, switch, router, hub or the like, the multi-path network including a plurality of network ports; a plurality of network elements; and a plurality of network links interconnecting the network elements and the network ports for transporting data packets, each network element including a fault monitor for detecting faults on the network links to which the network element is connected, a plurality of dynamically selectable output ports and output port selection mechanism and each network element being adapted to communicate the existence of a fault back to one or more other network elements via which network elements the faulty network link can be bypassed, and each network element being adapted to update the output port selection mechanism when communication of the existence of a fault is received so that only output ports which ensure the faulty network link is bypassed are dynamically selectable.

In a preferred embodiment the fault monitor of each network element is adapted to detect corruption in the contents of data packets input to the network element and the network elements are adapted to communicate the existence of a fault triggered by a corrupted data packet back along the path followed by that data packet across the network prior to its corruption. When communicating the existence of a fault, the network elements may be adapted to issue a fault communication which includes identification of only one other network element, in the path followed by the data packet prior to its corruption, which is required to update its respective output port selection mechanism in order to bypass the faulty network link.

Alternatively, when communicating the existence of a fault, the network elements may be adapted to issue a fault communication which includes identification of the network element issuing the fault communication, and the network elements may be adapted to determine on the basis of the network element that issued a fault communication whether their respective output port selection mechanism requires updating.

In either embodiment, an algorithmic analysis may be used to identify the one other network element which must update its output port selection mechanism to ensure the faulty network link is bypassed in future.

Furthermore, in a preferred embodiment the network elements may be adapted to communicate the existence of a fault by including an error warning in a delivery acknowledgement whenever a corrupted data packet is received.

Ideally, the output port selection mechanism comprises a port selection register in which is stored output ports available for dynamic selection in association with network port destinations and, in response to receipt of a communication concerning the existence of a fault, the network elements may be adapted to cancel from the port selection register the output port previously used by the corrupted data packet.

Each network element may include a plurality of port selection registers in which the network port destinations are distributed amongst the port selection registers, so that, in response to receipt of a communication concerning the existence of a fault, the output port previously used by the corrupted data packet is cancelled in only the port selection register where the output port is associated with the network port destination of the corrupted data packet.

In a further preferred embodiment each network element has a plurality of input ports and each input port is assigned a respective one or more port selection registers.

It is also desirable for each network element to be adapted to re-enable a previously cancelled output port in the port selection register after a predetermined time period.

In a separate aspect the present invention provides a method of managing faults in a multi-path network, the network having a plurality of network ports, a plurality of network elements, the network elements having a plurality of dynamically selectable output ports and output port selection mechanism; and a plurality of network links interconnecting the network elements and the network ports for transporting data packets, the method comprising the steps of: monitoring for faults on a network link; communicating the existence of a fault from a network element which detects a fault back to one or more other network elements via which the faulty network link can be bypassed; and updating the switch port selection mechanism of said one or more other network elements so that only switch ports which ensure the faulty network link is bypassed are dynamically selectable.

Preferably, the step of monitoring for faults comprises checking for corruption in the contents of data packets input to the network element and the existence of a fault triggered by a corrupted data packet is communicated back along the path followed by that data packet across the network prior to its corruption.

When the existence of a fault is communicated, a fault communication may be issued which includes identification of only one other network element, in the path followed by the data packet prior to its corruption, which is required to update its respective output port selection mechanism in order to bypass the faulty network link.

Alternatively when the existence of a fault is communicated, a fault communication may be issued which includes identification of the network element issuing the fault communication, so that the other network element required to update its output port selection mechanism identifies itself on the basis of the network element that issued the fault communication. Ideally, an algorithmic analysis is used to identify the one other network element which must update its output port selection mechanism to ensure the faulty network link is bypassed in future.

In a preferred embodiment the existence of a fault is communicated by including an error warning in a delivery acknowledgement whenever a corrupted data packet is received.

The output port selection mechanism may comprise a port selection register in which is stored output ports available for dynamic selection in association with network port destinations so that, in response to receipt of a communication concerning the existence of a fault, an output port previously used by the corrupted data packet may be cancelled from the port selection register.

Preferably each network element comprises a plurality of port selection registers in which the network port destinations are distributed amongst the port selection registers, so that, in response to receipt of a communication concerning the existence of a fault, the output port previously used by the corrupted data packet may be cancelled in only the port selection register where the output port is associated with the network port destination of the corrupted data packet.

Each network element may have a plurality of input ports and the one or more port selection registers may be duplicated at each input port.

Also, after a predetermined period of time a previously cancelled output port in the port selection register may be re-enabled.

Thus the present invention provides a network which is tolerant to and can make maximum use of links with intermittent faults while only introducing an insignificant error rate whilst at the same time maximising the possible bandwidth from the remainder of the network which is free of network errors.

Moreover, the present invention avoids the need for a supervisory manager, separate from the individual network elements in the network, and avoids the need for the entire network to be re-evaluated whenever a fault is discovered. Instead, the existence of the fault is communicated directly from the network element that discovers the fault to only the network elements which most recently sent a data packet via the faulty network link.

The foregoing and other objects, aspects and advantages will be better understood from the following detailed description of a preferred embodiment of the present invention with reference to the drawings, in which:

DETAILED DESCRIPTION OF THE PREFERRED EMBODIMENT

The method for managing faults in a multi-path network described herein is applicable to any network where there are multiple routes from a source or ingress port to a destination or egress ports permitting dynamic routing of PDUs across the network. Furthermore, all the examples given below show unidirectional links to improve the clarity of the diagrams but the mechanism is equally valid for a full duplex link implementation.

A very large multi-port, multistage bridge fabric switch can have many thousands of network links and any one of the links is a potential source of errors. The method described herein may allow a very occasional error to corrupt the data of a PDU being routed across the network, provided the error is detected by a CRC, but the method prevents a link from continually creating error after error on many separate PDUs.

The Ethernet bridge or router described below introduces an additional protocol layer, referred to herein as an 'Encapsulation Layer', that appears between the Physical Layer and the Data Link Layer of the standard OSI model which can encapsulate both Network Layer and Data Link Layer PDUs.

In the context of this document the definitions of an intermediate station is extended to include a station capable of forwarding packets encapsulated at the additional protocol layer referred to herein as the Encapsulation Layer. This type of station will be referred to herein as a Bridge Fabric or Network Fabric. A multi-port Bridge Fabric may be implemented by a collection of Bridge Fabric Switches (BFSs) interconnected by Bridge Fabric Switch Links (BFSLs).

Complete encapsulation in a PDU, which is the subject of co-pending United Kingdom patent application number 0807937.8, the whole contents of which is incorporated herein by reference, and which is referred to herein as a 'Fabric Protocol Data Unit' (FPDU), avoids the necessity of modifying the underlying PDU frame headers or trailers, and thus removes the overhead of recalculating the cyclic redundancy check (CRC) or other derived information based upon the contents of the frame. A FPDU is used in implementation of data transmission, acknowledgement and flow-control mechanisms. A FPDU can be further utilised to provide many other attractive features important to large, high performance, scalable Ethernet networks.

Figure 3:
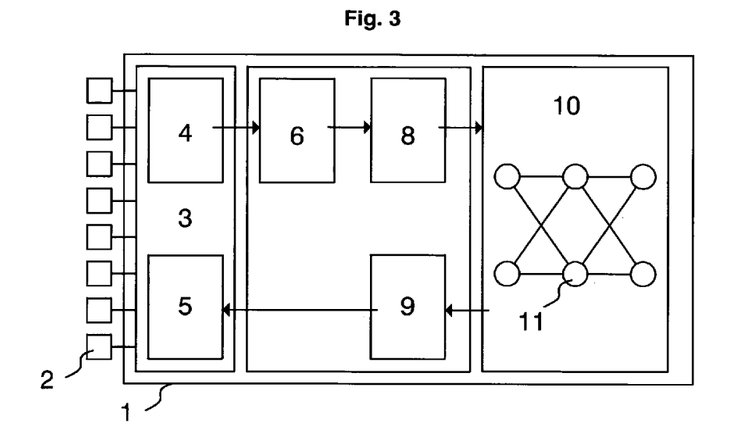
FIG. 3 illustrates schematically an Ethernet bridge that includes a multi-path network in accordance with the present invention.

An Ethernet bridge or router 1 is illustrated in FIG. 3 which may be connected to a plurality of separate Ethernet stations 2 and which implements the encapsulation of both Network Layer and Data Link Layer PDUs in a FPDU. The Ethernet bridge 1 generally comprises a multi-path network 10 in combination with a plurality of Ethernet ports 3 (only one is illustrated for the sake of clarity) with each port being individually connectable to an Ethernet station 2. The Ethernet ports 3 are generally conventional in design and each includes means for establishing a data connection with an Ethernet station, a receiving means or input 4 for performing Ethernet receive functions and a transmitting device or output 5 for performing Ethernet transmit functions.

The Ethernet ports 3 are connected to a network interface 7 that provides conventional functionality such as packet buffering 6. However, the network interface 7 additionally includes an Ethernet PDU encapsulator 8 which connects the network interface 7 to ingress ports (not shown) of the network 10 and an Ethernet PDU decapsulator 9 which connects egress ports (not shown) of the network 10 back to the Ethernet ports 3. The Ethernet PDU encapsulator 8 implements the protocol of the Encapsulation Layer and thus is responsible for the generation of the FPDUs. Ideally, each port 3 of the Ethernet bridge 1 has a respective network interface 7 and thus a respective Ethernet PDU encapsulator 8 and a respective Ethernet PDU decapsulator 9.

Figure 4:
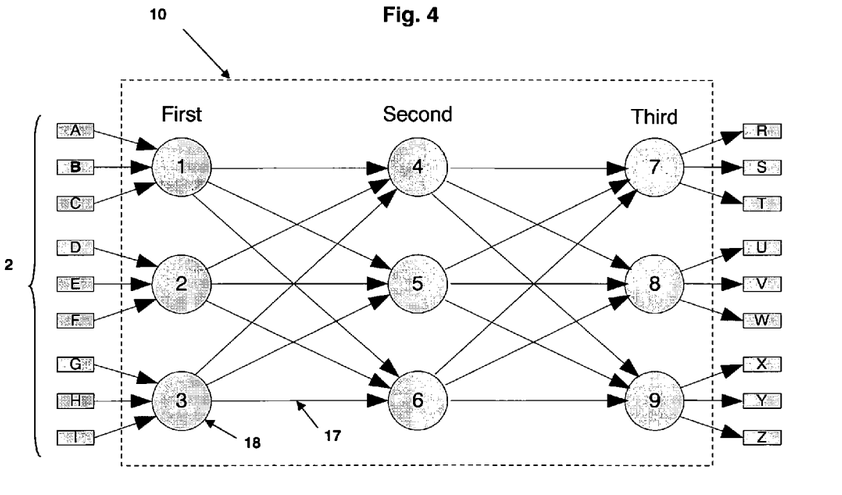
FIG. 4 is a schematic diagram of the multi-path network of FIG. 3, in accordance with the present invention.

The network 10, which is a proprietary multi-path network, comprises a plurality of interconnected network elements 18 referred to herein as bridge fabric switches (BFSs) interconnected by network links 17 in the form of bridge fabric switch links (BFSLs). Each BFSL 17 is preferably a bi-directional (full duplex) connection. Data is sent in each direction and acknowledgments and flow control state for data in one direction can be multiplexed with the data sent in the opposite direction of the BFSL. As mentioned earlier, the multi-path network 10 illustrated in FIG. 4 consists of only nine BFSs 18. Of course, in a large network there will be many more BFSs and a packet traversing the network 10 will pass through many BFSs 18 and BFSLs 17 before egress from the network 10. Network packets transmitted across the network fabric are referred to herein as Fabric Protocol Data Units (FPDU) and these correspond to encapsulated Ethernet PDUs. The rectangles A to I in FIG. 4 represent ingress ports 2 and the rectangles R to Z represent egress ports. Each one of the circles 1 to 9 is a BFS 18 and the arrowed lines are unidirectional BFSLs 17. Each BFS in this network has only three input ports and three output ports giving it an arity of just 3. Real networks are normally constructed with BFSs with a much large arity of perhaps 16 or more. The illustrated network has been assigned BFSs with a small arity for the sake of clarity.

Although each BFS has an arity of 3, the multi-path network 10 illustrated in FIG. 4 still has enough richness to allow self-healing to occur. Every ingress port 2 has three possible connections to any egress port. Hence, an FPDU moving from any ingress port to any egress port can pass through any one of the three BFSs 4, 5 or 6. If any one of the internal BFSLs were to fail, then two other routes exist to carry FPDUs across the whole bridge.

The multi-path network described herein assumes the existence of a reverse acknowledgement control flow. This is a small amount of control information that is used to indicate the successful transmission of the bulk data in the forward direction. This control information could be provided through the use of additional sideband signals or could be implemented by stealing a small amount of bandwidth from the reverse direction on a full duplex BFSL 17. The BFSs 18 of the multi-path network 10 are adapted to ensure that each control acknowledgment is automatically routed back along the path taken by the FPDU it is acknowledging. The control acknowledgement is used to update state at each BFS in the return or acknowledgment path to acknowledge delivery of the FPDU that was routed via that BFS.

By signalling the delivery of FPDUs to their egress ports, the reverse acknowledgement control flow is used to provide control of packet ordering in an otherwise dynamic routing multi-path network. If a data flow has to be changed to relieve congestion, for example, then new FPDUs are not released onto the link of a new route until all the acknowledgments relating to data transmitted over the old route have been received at the point in the network where the route change is going to take place. Additionally, the reverse acknowledgements themselves provides the means for communicating re-routing information back to earlier stages in the network either to enable a data flow to be redirected onto less congested links or to avoid faulty links.

Looking at FIG. 4 it can be seen there are three stages of switching labelled first, second and third. The second and third stages direct the FPDUs to the desired egress port. The first stage can be used to dynamically route the FPDUs to any of the second switching stage BFSs. If an error or sequence of errors occurs on any of the BFSLs between the first and second switching stages then the error will be detected by a BFS connected to the BFSL in the second switching stage by means of a conventional CRC. The BFS at the first switching stage which is connected to the BFSL that generated an error is then informed of the problem using the reverse acknowledgement control flow by means of an error type attached to the conventional acknowledgement to indicate a problem. The offending BFSL can then be excluded from being used as a reasonable selection by the BFS in the first switching stage in a future dynamic routing selection from the first stage to the second stage of switching. If an error occurs between the second and third switching stage then this can also be avoided by making a change in the initial dynamic switching stage.

Figure 5:
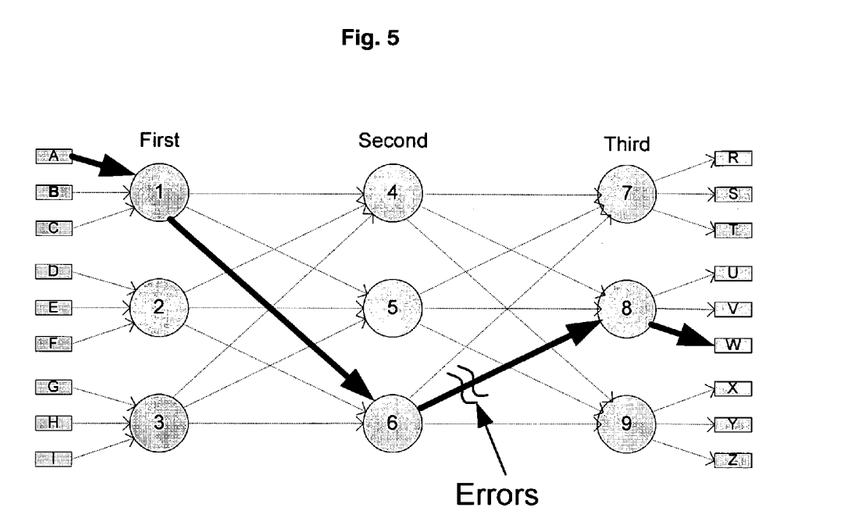
FIG. 5 is a schematic diagram of the multi-path network of FIG. 4 illustrating a route across the network where a fault is encountered.

FIG. 5 illustrates a path across the network of FIG. 4 from ingress port A to egress port W where errors are occurring on the BFSL between BFS 6 and BFS 8. If no errors are found then the normal flow of FPDUs from A to W would, in turn, generate a flow of acknowledgments back from W to A. However, in the case illustrated in FIG. 5 some of the FPDUs from BFS 6 to BFS 8 are being corrupted. This is detected by BFS 8 when it receives FPDUs because the CRC generated from the body of the FPDU does not match the received CRC appended to the end of the FPDU. Having identified an error, BFS 8 issues an error acknowledgement that is passed back to ingress port A via each of the BFSs involved in the forward routing of the now corrupted FPDU. Hence, BFS 1 will see this error acknowledgment and acts to remove BFS 6 as a reliable connection to egress port W.

Looking at FIG. 5 it can be seen that any connection from ingress ports A, B or C to egress ports U, V or W can suffer problems if the connection is made through BFS 6. In fact this is true for any ingress port trying to connect to egress ports U, V or W where the connection is made through BFS 6.

The simplest solution to errors on the BFSL between BFS 6 and BFS 8 is to avoid sending any data to BFS 6. However this is inefficient as data sent from BFS 6 to BFS 7 and BFS 9 can still be transmitted reliably. The most complex solution is to allow transmission of FPDUs to BFS 6 from the first switching level provided the final egress port does not include egress ports U, V or W. With a network with only 9 egress ports this more complex solution of identifying the precise egress ports to be avoided in order to avoid the BFSL between BFS 6 and BFS 8 can be contemplated. However, where the network has thousands of egress ports the state required to identify the precise ports to be avoided for all BFS with broken BFSLs becomes excessive. On the other hand, the simple solution that just avoids sending any data in a direction that could possibly use a broken BFSL could prohibit more of the network's total bandwidth than is reasonable.

In a very large network there will be many ingress to egress connections that do not occur frequently. As the acknowledgment control flow carries the error information only to those BFSs on the path of the original FPDU, then there are BFSs that are not informed of the problem and will dynamically route FPDUs via the BFSL which is to be avoided, until they too receive an error acknowledgement. In FIG. 5, for example, if the ingress ports D, E and F did not happen to need to send any FPDUs to any of the ports U, V and W then BFS 2 would never receive any error acknowledgments from BFS 6 and as a consequence would never be triggered to exclude BFS 6 as a reasonable choice for dynamic routing. Hence, all connections made to other egress ports would reasonably continue to use BFS 6.

To minimise the restrictions placed on dynamic routing whilst ensuring faulty links of the network are reliably avoided, each network input port is given its own mask of acceptable output ports for a dynamic routing choice. Then if ingress port D, for example, has a conversation with any of the egress ports U, V or W and consequently discovers BFS 6 needs to be excluded, network ingress ports E and F remain ignorant of the errors are still able to use BFS 6 because they have not sent FPDUs over the BFSL between BFS 6 and BFS 8.

Figure 6:
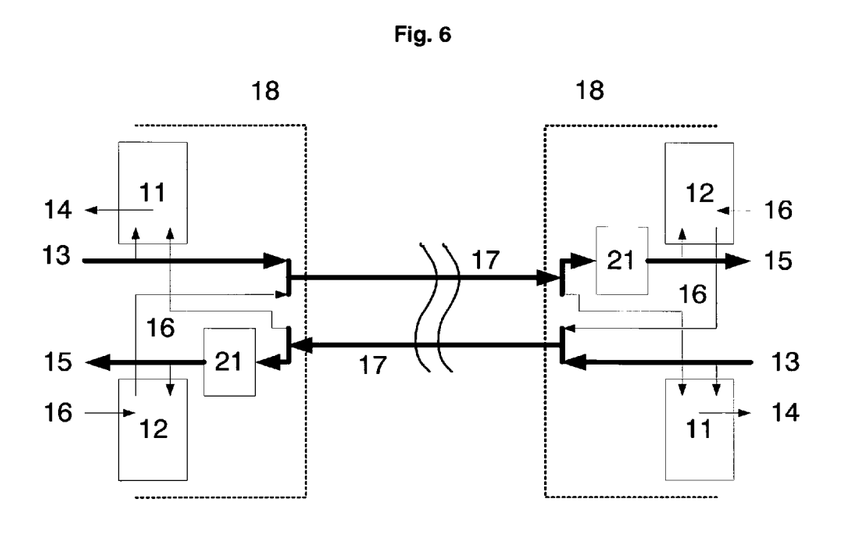
FIG. 6 is a schematic diagram of the detail of the edges of two network elements interconnected by a network link, in accordance with the present invention.

As shown in FIG. 6, the dynamic routing mask is preferably implemented in the form of one or more registers 12, beyond the input port buffers 21, on each BFS. Each register 12 identifies a group of network port destinations in relation to one or more adaptively selectable switch output ports. Setting a bit in the register disables or cancels the dynamic selection of the switch output port for that group of network ports. Ideally, the routing tables are replicated for each of the input ports to a BFS in order to simplify the internal timing of the BFS design.

With the fault management method described herein a plurality dynamic routing masks may be issued to each of the inputs ports with each dynamic routing mask sensitive to a particular range of egress ports. Through the use of multiple independent masks the impact of disabling one of the adaptive BFSLs is further reduced in direct relation to the number of masks involved. For example, if each input is given 8 masks then only when that input is directing FPDUs to egress ports in the range that includes the failing link will one of the BFS output ports be disabled. Thus the chances of an output port being disabled are reduced by a factor of 8.

Figure 7:
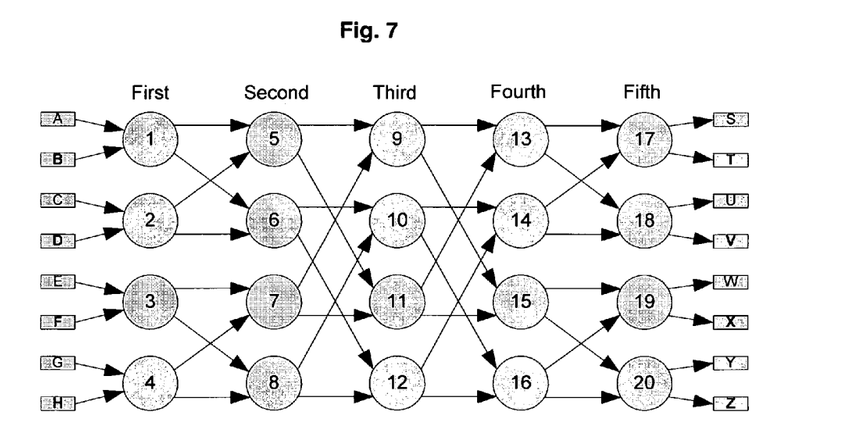
FIG. 7 is a schematic diagram of a larger multi-path network also in accordance with the present invention.

The previous example illustrated a multi-path network with two levels of destination switching and one level of adaptive switching. The multi-path network described herein also works well for more levels of switching. FIG. 7 illustrates a multi-path network with 3 levels of destination switching (BFS 9 to 20) and 2 levels of adaptive switching (BFS 1 to 8). However, the arity of these switches has been reduced for the sake of clarity.

Looking at FIG. 7 it can be seen that the illustrated network is symmetrical. Symmetry is not an essential feature of the multi-path network described herein but symmetry does simplify implementation of the method of fault tolerance. This symmetry can be used to identify the place in the network a switching change should be made to avoid a fault. An internal fault can occur on any of the BFSLs between any of the switching stages. If the failing BFSL is connected to the output of an adapting BFS then that adapting BFS can simply not issue any data onto that BFSL. This is done by excluding that BFSL from being a valid BFS port output on any dynamic route connection in that BFS. Looking at FIG. 7 the adapting switches are the first and second switching stages (BFS 1 to 8). So a fault between the first and second stages is avoided on the first layer BFSs and a fault between the second and third switching stages is avoided on the second stage.

Figure 8:
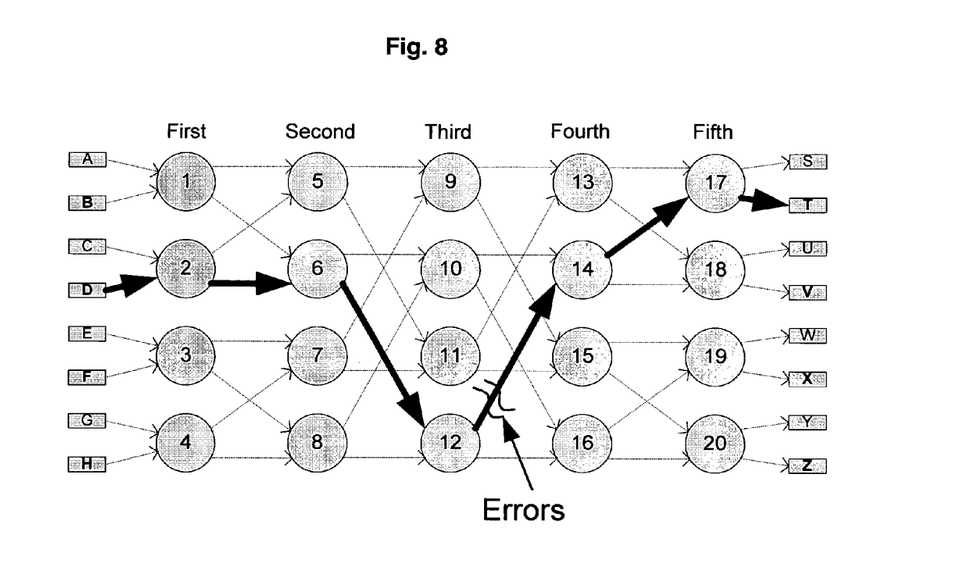
FIG. 8 is a schematic diagram of the multi-path network of FIG. 6 illustrating a route across the network in which a fault is encountered.

FIG. 8 also shows a fault on a BFSL between the third and fourth switching layers on a connection from ingress port D to egress port T. It is clear in FIG. 8 that the correct place to adjust a dynamic routing selection to guarantee to avoid the broken or failing BFSL is on BFS 6. In this example this will cause the FPDUs moving from port D to T to pass through BFS 10 instead of BFS 12.

Figure 9:
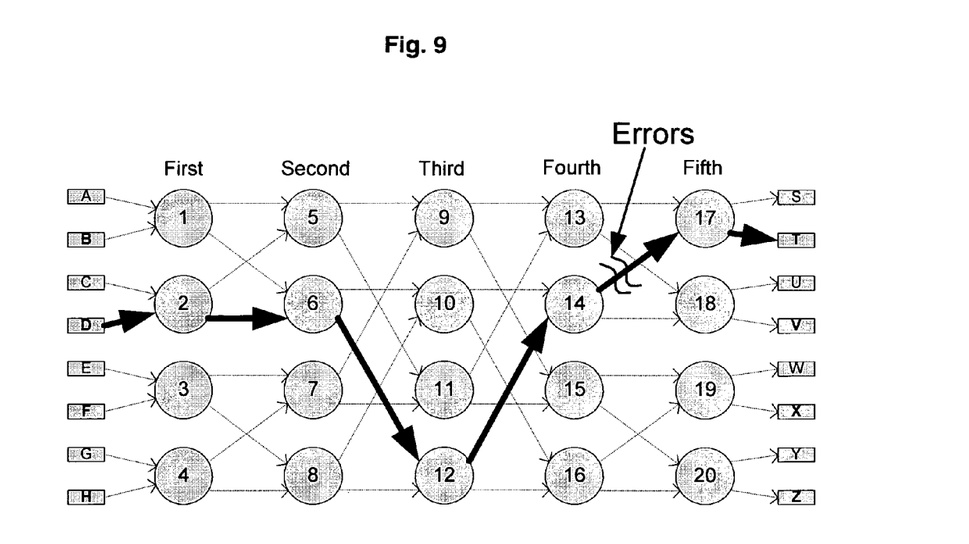
FIG. 9 is a schematic diagram of the multi-path network of FIG. 6 but with a different fault.

In FIG. 9 a fault is shown on a BFSL between the fourth and fifth switching layers on a connection from ingress port D to egress port T. In this case the fault can only be avoided by forcing the FPDUs to enter BFS 17 from BFS 13. Thus changing the output port of BFS 6 will have no effect. The only way to force the data to arrive on the right link is by changing to the other output port of BFS 2.

These examples illustrate that a simple algorithmic approach can be used to identify the adaptive BFS where a change has to occur to avoid a fault. If the network has the symmetry shown in FIG. 7 then when a fault is detected on the switching stage closest to the egress ports then the adaptive masks must be adjusted on the switching stage closest to the ingress ports. If the fault is on the second closest BFS to egress then the adaptive masks must be changed on the second closest BFS to ingress. If the network has more stages then this rule can still be used but with the third closest or fourth closest and so on. These rules apply equally for networks having different numbers of stages, different symmetry, different numbers of ports and different degrees of interconnection. Even where the network has a completely different topology, similar rules, reflecting the differences in the topology, can be identified to find the appropriate BFSs where routing changes must be made through adjustment of the relevant dynamic routing mask.

In the alternative, it is of course possible for each BFS to include a map of the multi-path network which would enable identification of the relevant output port of the BFS to be disabled in the dynamic routing mask. Acknowledgments which include an error type therefore also carry a parameter value. The parameter value is used to identify the adaptive switching level that should act up the acknowledgment error and adjust its dynamic routing masks to reflect the network fault. The BFS detecting the fault uses its own position in the network to generate an appropriate parameter value for the error acknowledgment. The acknowledgment is passed back through the network and, other than its normal acknowledgement function, is ignored by all non-adapting BFS it passes through. The acknowledgement with an error type and parameter value is also ignored by adapting BFSs that do not match the parameter value. Finally the acknowledgement is received at the adapting switch with a matching parameter value or network level. The adapting switch responds to the acknowledgement by disabling dynamic selection of the output port of the BFS relevant to the BFSL to be avoided. This is the port the FPDU was output from and also the port the acknowledgment was received on. The output port is disabled by setting the relevant bit in the dynamic routing mask of the ingress port the FPDU was received on in the adapting switch. Where a plurality of dynamic selection masks are in use, the disabling of the dynamic selection of that port is only applied to the one mask or routing table specific to the egress ports affected by the faulty link.

When the error acknowledgment is received, the FPDU data stream is halted until acknowledgments for all the FPDUs sent have been received. The last acknowledgement signals that some or all the data previously sent will have either been sent from the egress port or has been completely lost on the faulty BFSL. Some of the data sent from the egress port may have been corrupted by the faulty BFSL. It is expected that this data will probably be requested to be resent by higher layers of the OSI reference model stack. This is not described in detail here as a conventional methodology for the re-sending of corrupted or missed PDUs may be implemented. Once the last acknowledgment is received a fresh adaptive selection can be made for fresh FPDUs, using the new mask values, and these new FPDUs will be sent on a different output port that will no longer be able to reach the failing BFSL.

The impact of a fault on a network built using BFS with an arity of 2 is high with half of the bandwidth from the switching stage being lost. Normally networks are constructed from BFS with a much high arity of perhaps 8 or 16. Here the effect of the fault on the bandwidth from the BFS is correspondingly reduced from ½ to ⅛ or ¹⁄₁₆.

A method is described herein for masking out output switch ports from dynamic route selections automatically. This ensures that very little data is corrupted and once a fault is found the broken BFSL is ignored by all new network traffic from BFSs that have previously send traffic across the faulty link.

Faults can occur for many reasons. Some faults are permanent until hardware is replaced. Some faults are created by cables being unplugged and then perhaps re-seated. Occasionally a one-off untraceable soft fault will be generated. A very low error rate is acceptable within a large network provided the error rate is at a sufficiently low rate as to not impact on the total system performance. When responding to an acknowledgement with an error type, the BFS automatically sets bits in the dynamic routing mask to re-route FPDUs away from the faulty BFSL. These bits can be cleared by a controlling management processor associated or forming part of the BFS at a very low frequency to re-enable the faulty BFSLs, for example every 30 seconds. If the fault is permanent then the bits will simply become set again although this could take some time as the network traffic patterns may have changed so that conversations from that adapting BFS to the faulty BFSL are no longer taking place. If the fault was temporary then the BFSL will just be re-enabled and its bandwidth with contribute to the total fabric bandwidth.

The fault management method described herein offers a significant improvement over conventional static disablement of network links as it minimises the magnitude of the effect of a fault on the network in terms of lost bandwidth.

As mentioned earlier, if the multi-path network is constructed with full duplex BFSL then errors detected in one direction can be reported in the other direction. This could be achieved by returning acknowledgments indicating the presence of the detected errors on the return path. If the error rate is high enough, the whole link may be disabled by the end of the link receiving the errors. A number of conventional protocols exist to allow the ends of a full duplex link to negotiate an appropriate level of readiness. Having seen an error the link might be brought down and then the normal link bring up negotiation process is initiated. If another error occurs then the whole processes could be repeated perhaps indefinitely if the error persists. Preferably, a faulty BFSL is deemed broken in both directions if errors are detected in one direction. As it is possible to receive very occasional errors, in a preferred implementation of the fault management method a number of consecutive errors must be received before the BFSL is considered unusable. Moreover, it is assumed that the BFSL is always receiving valid data or control tokens and so a BFSL should also be considered broken if this is not the case.

With the multi-path network described herein which implements dynamic routing, means are provided for maintaining packet ordering as FPDUs are transported across the network. An example of packet ordering in a network which is suitable for implementation with the multi-path network described herein may found in GB patent application no. 0808862.7, the contents of which is incorporated herein by reference.

The multi-path network described herein is truly scalable offering from 256 ports or fewer up to 48,000 ports or more. A single Ethernet bridge or router using the method and apparatus described herein is capable of providing greatly increased connectivity in comparison to conventional Ethernet bridges. For example, currently the largest 10 Gbe Ethernet bridges (which are modular in construction) offer only 288 ports. With the network of the present invention, a single Ethernet bridge is possible which is capable of operating at 10 Gbe or above and is capable of offering, for example, 48,000 ports.

Although reference has been made herein to an Ethernet bridge or router it will, of course, be apparent that the present invention may be applied to any multi-path network which transports data packets between inputs and outputs to the network. Also, although the multi-path network has been described with respect to full duplex links, the links may alternatively comprise a half duplex link with a sideband to allow acknowledgments tokens and tags to be transmitted in the opposing direction.

Although the present invention has been described with respect to a specific multi-path network, it will, of course, be apparent that the present invention is applicable to any multi-path network which implements dynamic routing, such as adaptive routing. Moreover, the present invention is equally applicable to network topologies other than those illustrated herein involving different numbers of network elements and different degrees and different arrangements of interconnection. Also the present invention is not restricted to a network fabric which uses encapsulation of the data packets during its transit across the network.

It is to be understood, therefore, that various modifications to the preferred embodiment and the generic principles and features described herein will be readily apparent to those skilled in the art. Thus, the present invention is not intended to be limited to the embodiment shown and such modifications and variations also fall within the spirit and scope of the appended claims.

The invention claimed is:

1. A multi-path network for use in a bridge, switch, router, hub or the like, for communicating data packets between a plurality of network ingress ports and a plurality of network egress ports, the multi-path network comprising:
    a plurality of network elements; and
    a plurality of network links interconnecting the network elements, the plurality of ingress ports and the plurality of egress ports, wherein the network elements and the network links form a multi-path network fabric between the plurality of ingress ports and the plurality of egress ports;
    wherein the network elements each have a plurality of dynamically selectable output ports and an output port selection mechanism and a fault monitor for detecting faults on the network links to which the network element is connected, wherein the output port selection mechanism comprises a dynamic routing mask which is capable of disabling the ability to dynamically select predetermined output ports;
    wherein the network elements are each adapted to communicate the existence of a network link fault back to one or more other network elements of the plurality of network elements via which the faulty network link can be bypassed,
    wherein the network elements are each adapted to update the output port selection mechanism when communication of the existence of said network link fault is received so that only output ports which ensure the faulty network link is bypassed are dynamically selectable,
    wherein the fault monitor of each network element is further adapted to detect corruption in the contents of data packets input to the network element; and
    wherein the network elements are adapted to communicate the existence of a corruption fault triggered by a corrupted data packet back along the path followed by that data packet across the network prior to corruption of the corrupted data packet, thus allowing related output selection mechanisms along the path to be updated to prevent subsequent data packets from following the path followed by the corrupted data packet.

2. The multi-path network of claim 1, wherein, when communicating the existence of the network link fault or the corruption fault, the network elements are adapted to issue a fault communication which includes identification of only one other network element, in the path followed by the data packet prior to its corruption, which is required to update its respective output port selection mechanism in order to bypass the faulty network link.

3. The multi-path network of claim 1, wherein, when communicating the existence of the network link fault or the corruption fault, the network elements are adapted to issue a fault communication which includes identification of the network element issuing the fault communication, and wherein the network elements are adapted to determine on the basis of the network element that issued a fault communication whether their respective output port selection mechanism requires updating.

4. The multi-path network of claim 1, wherein using an algorithmic analysis the network elements are adapted to identify the one other network element which must update its output port selection mechanism to ensure the faulty network link is bypassed in future.

5. The multi-path network of claim 1, wherein the network elements are adapted to communicate the existence of the corruption fault by including an error warning in a delivery acknowledgement whenever a corrupted data packet is received.

6. The multi-path network of claim 1, wherein the output port selection mechanism comprises a port selection register in which is stored output ports available for dynamic selection in association with network port destinations and wherein, in response to receipt of a communication concerning the existence of the corruption fault, the network elements are adapted to cancel from the port selection register the output port previously used by the corrupted data packet.

7. The multi-path network of claim 6, wherein each network element comprises a plurality of port selection registers in which the network port destinations are distributed amongst the port selection registers, and wherein, in response to receipt of a communication concerning the existence of the corruption fault, the output port previously used by the corrupted data packet is cancelled in only the port selection register where the output port is associated with the network port destination of the corrupted data packet.

8. The multi-path network of claim 6, wherein each network element has a plurality of input ports and each input port is assigned a respective one or more port selection registers.

9. The multi-path network of claim 6, wherein each network element is adapted to re-enable a previously cancelled output port in the port selection register after a predetermined time period.

10. An Ethernet bridge including a multi-path network as claimed in claim 1.

11. A method of managing faults in a multi-path network configured for communication of data packets, the multi-path network having a plurality of ingress ports and a plurality of egress ports, and having a plurality of network elements and a plurality of network links interconnecting the network elements, the ingress ports, and the egress ports, the plurality of network elements and the plurality of network links forming a multi-path network fabric providing communication paths from the ingress ports to the egress ports, the network elements each having a plurality of dynamically selectable output ports and an output port selection mechanism, the method comprising the steps of:
    monitoring for faults on a network link;
    communicating the existence of a detected fault from a network element which detects a fault back to one or more other network elements thus allowing the faulty network link to be bypassed in subsequent communication across the multipath network; and updating the output port selection mechanism of said one or more other network elements so that only output ports which ensure the faulty network link is bypassed are dynamically selectable, wherein the output port selection mechanism comprises a dynamic routing mask which is capable of disabling the ability to dynamically select the faulry network link, wherein the step of monitoring for faults on the network link comprises checking for corruption in the contents of data packets input to the network element and wherein the existence of a corruption fault triggered by a corrupted data packet is also communicated back along the path followed by the corrupt data packet across the network prior to corruption of the data packet so that the switch port selection mechanisms of each of the network elements can be updated.

12. The method of claim 11, wherein, when the existence of a corruption fault is communicated, a fault communication is issued which includes identification of only one other network element, in the path followed by the data packet prior to its corruption, which is required to update its respective output port selection mechanism in order to bypass the faulty network link.

13. The method of claim 11, wherein, when the existence of a detected fault is communicated, a fault communication is issued which includes identification of the network element issuing the fault communication, and wherein the other network element required to update its output port selection mechanism identifies itself on the basis of the network element that issued the fault communication.

14. The method of claim 12, wherein an algorithmic analysis is used to identify the one other network element which must update its output port selection mechanism to ensure the faulty network link is bypassed in future.

15. The method of claim 11, wherein the existence of a corruption fault is communicated by including an error warning in a delivery acknowledgement whenever a corrupted data packet is received.

16. The method of claim 11, wherein the output port selection mechanism comprises a port selection register in which is stored output ports available for dynamic selection in association with network port destinations and wherein, in response to receipt of a communication concerning the existence of a corruption fault, an output port previously used by the corrupted data packet is cancelled from the port selection register.

17. The method of claim 16, wherein each network element comprises a plurality of port selection registers in which the network port destinations are distributed amongst the port selection registers, and wherein, in response to receipt of a communication concerning the existence of a corruption fault, the output port previously used by the corrupted data packet is cancelled in only the port selection register where the output port is associated with the network port destination of the corrupted data packet.

18. The method of claim 16, wherein each network element has a plurality of input ports and the one or more port selection registers are duplicated at each input port.

19. The method of claim 16, wherein after a predetermined period of time a previously cancelled output port in the port selection register is re-enabled.

20. A multi-path network for communication of data packets between a plurality of ingress ports and a plurality of egress ports, and capable of detecting faults and/or corruption, the multipath network comprising:
  a plurality of bridge fabric switches, each bridge fabric switch having a plurality of input ports, a plurality of output ports and an output port selection mechanism for dynamically selecting output ports for transmission of data packets, wherein the output port selection mechanism comprises a dynamic routing mask which is capable of disabling the ability to dynamically select predetermined output ports;
  a plurality of bridge fabric network links connecting the plurality of the bridge fabric switches to one another by interconnecting the output and input ports, the plurality of bridge fabric switches and the plurality of connected network links forming a multi-path network fabric; the plurality of bridge fabric network links also connecting the plurality of ingress ports and the plurality of egress ports to the multi-path network fabric;
  wherein each wherein each bridge fabric switch has a fault monitor for detecting faults on the bridge fabric network links attached thereto;
  wherein the bridge fabric switched are each configured to communicate the existence of a fault in a bridge fabric network link back to at least one of the other bridge fabric network switches so the faulty bridge fabric network link can be bypassed;
  wherein the bridge fabric switches are each further configured to update the output port selection mechanism when communication of the existence of said fault in a bridge network fabric link is received so that only output ports which will ensure that the faulty bridge fabric network link is bypassed are dynamically selectable,
  wherein the fault monitor of each bridge fabric network switch is further adapted to detect corruption in the contents of data packets input thereto; and
  wherein the bridge fabric network switches are configured to communicate the existence of a corruption fault triggered by a corrupted data packet back along the path across the network followed by the corrupted data packet prior to corruption of the corrupted data packet by including an error warning in a delivery acknowledgement, whenever a corrupted data packet is received, thus allowing related output selection mechanisms along the path can to be updated to prevent subsequent data packets from following the path followed by the corrupted data packet.

21. An Ethernet bridge including a multi-path network as claimed in claim 20.

* * * * *